United States Patent
Chalopin et al.

(10) Patent No.: US 7,313,646 B2
(45) Date of Patent: Dec. 25, 2007

(54) INTERFACING OF FUNCTIONAL MODULES IN AN ON-CHIP SYSTEM

(75) Inventors: Hervé Chalopin, Aubagne (FR); Laurent Tabaries, Aubagne (FR)

(73) Assignee: STMicroelectronics S.A., Montrouge (FR)

( * ) Notice: Subject to any disclaimer, the term of this patent is extended or adjusted under 35 U.S.C. 154(b) by 376 days.

(21) Appl. No.: 11/138,885

(22) Filed: May 26, 2005

(65) Prior Publication Data
US 2006/0010280 A1    Jan. 12, 2006

(30) Foreign Application Priority Data
Jun. 3, 2004    (FR) .................................. 04 06011

(51) Int. Cl.
G06F 12/00    (2006.01)
G06F 9/30     (2006.01)
G06F 15/00    (2006.01)
G06F 15/76    (2006.01)
(52) U.S. Cl. .................... 711/100; 712/200; 712/20; 712/21; 712/22; 712/24; 712/E9.28; 712/E9.029
(58) Field of Classification Search ................ 711/100; 712/200, 20, 21, 22, 24, E9.028, E9.029
See application file for complete search history.

(56) References Cited

U.S. PATENT DOCUMENTS

| 2003/0053547 A1 | 3/2003 | Aberl et al. ................. 375/257 |
| 2003/0135676 A1 | 7/2003 | Jensen ......................... 710/107 |
| 2003/0206547 A1 | 11/2003 | Cho .......................... 370/364 |

*Primary Examiner*—Kimberly McLean-Mayo
(74) *Attorney, Agent, or Firm*—Lisa K. Jorgenson; Robert Iannucci; Seed IP Law Group PLLC

(57) ABSTRACT

An electronic system comprises an initiator module and a target module addressable by the initiator module, and an interface and control module for interfacing between respective communication protocols of the initiator module and of the target module. The interface and control module is constructed to set a composite instruction detection signal in response to the detection of a composite instruction executed by the initiator module, which composite instruction detection signal is used for the interfacing. The interface and control module is constructed to detect a composite instruction executed by the initiator module when, at a determined clock cycle of the initiator module, a change of the elementary operation executed by the initiator module is detected with respect to the previous clock cycle of the initiator module, while, at the same time, a signal for selecting the target module which was active is kept active.

27 Claims, 3 Drawing Sheets

INTERFACING OF FUNCTIONAL MODULES IN AN ON-CHIP SYSTEM

BACKGROUND OF THE INVENTION

1. Field of the Invention

The present invention pertains in a general manner to the field of integrated-circuit electronic systems, called "Systems on a Chip" or SoC.

2. Description of the Related Art

More particularly, the invention relates to the interfacing between functional modules of such a system which comply with the specifications of distinct respective communication protocols.

A functional module of a system on a chip is sometimes called a virtual component or "Intellectual Property" block, or else IP block in the jargon of the person skilled in the art. It is designed to undertake a determined function, or is for general use (it may possibly be a microprocessor or a microcontroller). It can be embodied in the form of hardware elements and/or of software elements.

A distinction is made between modules of master type (hereinafter initiator modules), which take the initiative in exchanging data with one or more other modules, and modules of slave type (hereinafter target modules), whose role is to respond to the requests received from the initiator module which is in charge. Should there be a plurality of initiator modules, an arbitration unit (or arbiter) is responsible for arbitrating in respect of conflicting requests for access to a common resource originating from distinct initiator modules, so as to grant an exclusive right of access to the resource, to a determined one of the said initiator modules.

Conventionally, the functional modules communicate via at least one communication bus comprising a data bus, an address bus and a control bus, complying with the specifications of a determined communication protocol. According to certain protocols the processing of a request may begin with the implementation of a link setup procedure with mutual acknowledgements (otherwise known as "handshake"). The expression link setup procedure is understood to mean a procedure in the course of which the initiator module and the target module exchange control signals, until they are ready for the mutual transmission of data.

When functional modules are designed to comply with the specifications of distinct respective communication protocols, means of interfacing and/or of control are provided so as to allow them to communicate with one another.

Functional modules of initiator type exist, in particular microcontrollers and/or microprocessors, which possess an instruction set comprising composite instructions. The expression composite instruction is understood to mean an instruction which corresponds to more than one elementary operation. In principle, the duration of execution of a composite instruction therefore takes more than one clock cycle of the initiator module.

For example, the instruction set of the ST7 microcontroller from STMicroelectronics possesses a BSET instruction and a BRST instruction, the execution of which takes three cycles of its activation signal (clock signal of the ST7) and which each correspond to several elementary operations for one and the same Operation Code (or "OP Code"). In particular, they implement two requests for access to the target module, of which one is a read request and one a write request. In fact, they correspond in total to three elementary operations or atomic level operations, that is to say of lower protocol level, which is the level of an operation of the microcode corresponding to a request.

The interfacing of an initiator module thus having an instruction set comprising at least one composite instruction with a determined target module, which is performed when the two functional modules comply with different communication protocols, may then pose specific problems.

In particular, if the target module provides for the execution of a "handshake" before processing each request, provision must be made for an interface and control module to implement a particular processing during the execution of a composite instruction, which module effects the interface between the initiator module and the target module. Specifically, given that, from the point of view of the target module, there are several successive and distinct access requests (two in the example of the BSET and BRST composite instructions of the ST7 microcontroller), it is necessary to perform a "handshake" for the execution of each of the said requests, although they correspond to the processing of just a single instruction.

Furthermore, when an arbitration mechanism is provided to arbitrate in respect of conflicting requests originating from several distinct initiator modules, it may be necessary to provide measures to avoid another initiator module being able to obtain the right of access during the execution of the successive requests corresponding to one and the same instruction executed by a determined initiator module.

Now, certain at least of the known initiator modules, and in particular the aforesaid ST7 microcontroller, do not output information indicating directly whether the instruction undergoing execution is or is not a composite instruction. Such information may be rendered available inside the initiator module, in particular at the instruction decoding level, but it is not accessible from outside and is therefore not utilizable for the interfacing.

It follows that the interfacing of such a functional module with other functional modules complying with the specifications of a different communication protocol poses a problem of a protocol nature, which does not come within the conventional framework of the shaping of signals at the electrical level.

BRIEF SUMMARY OF THE INVENTION

One embodiment of the invention solves the aforesaid problems of the prior art, by making it possible to produce a cue indicating whether an instruction undergoing execution by an initiator module is or is not a composite instruction, on the basis solely of the information conventionally output by the initiator module. This is a binary cue, which may take the form of a detection signal with two logic levels. It can be utilized by an interfacing module.

Thus, a first embodiment of the invention proposes an electronic system comprising an initiator module complying with the specifications of a first communication protocol, and at least one target module addressable by the initiator module and complying with the specifications of a second communication protocol, different from the said first communication protocol, and furthermore an interface and control module, which is for example arranged between the initiator module and the target module, for interfacing between the first communication protocol and the second communication protocol.

The interface and control module is coupled to a communication bus used by the initiator module to communicate with the outside.

The interface and control module is constructed so as to set (preferably in a hardware manner, for speed) a composite instruction detection signal in response to the detection of a composite instruction executed by the initiator module, said composite instruction detection signal (which may be purely internal to the interface and control module, or be accessible from outside the module) may be used for the interfacing. The interface and control module is also constructed to detect a composite instruction executed by the initiator module by monitoring, at each determined clock cycle of the initiator module, the evolution of nondedicated information which is collected on the communication bus, with respect to the previous cycle of the initiator module. The nondedicated information which is collected at a determined clock cycle of the initiator module comprises on the one hand information identifying the elementary operation undergoing execution by the initiator module at this clock cycle, and on the other hand the current logic value of a signal for selecting the target module. A composite instruction is detected when, at a determined clock cycle of the initiator module, a change of the elementary operation executed by the initiator module is detected with respect to the previous clock cycle of the initiator module, while, at the same time, the signal for selecting the target module which was active is kept active.

In one embodiment, the interface and control module comprises a memory for storing at each cycle of the clock signal of the initiator module the information identifying the elementary operation undergoing execution and the current value of the signal for selecting the target module.

For example, the information stored in the memory is overwritten at each clock cycle of the initiator module by the corresponding information which is collected on the communication bus, after comparison with the said corresponding information.

In one embodiment, the system can furthermore comprise an address decoder for generating the signal for selecting the target module. As a variant, address decoding means are provided in the interface and control module, to generate the target module selection signal.

In one embodiment, the information identifying the elementary operation undergoing execution by the initiator module comprises the instantaneous value of a read/write signal (R/W signal) delivered on the communication bus by the initiator module.

As a variant or as a supplement, the information identifying the elementary operation undergoing execution by the initiator module can also comprise the instantaneous value of address signals delivered on the communication bus by the initiator module.

Certain composite instructions comprise an elementary read operation and an elementary write operation at the same address of the target module, as is the case for the aforesaid BSET and BRST instructions for the ST7 microcontroller. Such a composite instruction may advantageously be detected when, at a determined clock cycle of the initiator module, the value of the read/write signal changes with respect to the previous clock cycle of the initiator module, while, at the same time, the address signals remain constant and the signal for selecting the target module which was active is kept active.

A second embodiment of the invention proposes a storage key comprising at least one nonvolatile memory and a control circuit, wherein the control circuit is a circuit on a chip (SoC) forming a system according to the first embodiment hereinabove.

BRIEF DESCRIPTION OF THE SEVERAL VIEWS OF THE DRAWINGS

Other characteristics and advantages of the invention will become further apparent on reading the description which follows. The latter is purely illustrative and should be read in conjunction with the appended drawings, in which.

DETAILED DESCRIPTION OF THE INVENTION

The invention is described hereinafter in an exemplary application to a control circuit intended to manage a storage key or memory key.

A memory key forms a mass storage medium of small dimensions, mounted in a removable support taking the form of a key or key holder. This medium makes it possible to store and to transport, easily, a certain quantity of data, with the aim, for example, of transferring them from one computer to another. Such a memory key is in principle inserted into the USB ("Universal Serial Bus") ports of the computers. This is why it is also called a USB storage key, USB memory key or quite simply USB key.

Figure 1:
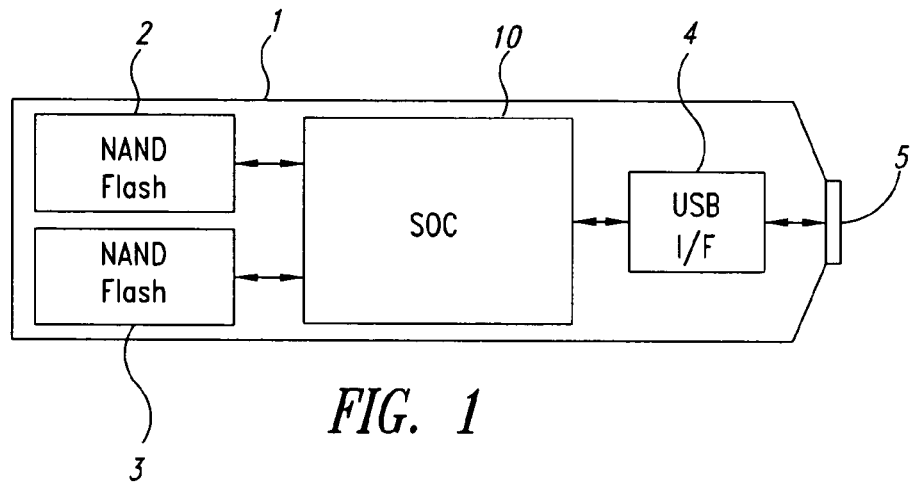
FIG. 1 is a schematic diagram of an exemplary memory key according to the second embodiment of the invention.

In FIG. 1, such a memory key 1 comprises a control circuit 10, coupled to a USB type connector 5, via a USB interface circuit 4. Moreover, the circuit 10 is coupled to one or more nonvolatile memories 2, 3 of large capacity, which are for example memories of NAND-Flash or similar type. The circuit 10 is remotely energized when the memory key 1 is connected via the connector 5 to a computer (not represented) or similar. The interface circuit 4 may for example ensure compatibility with the USB 2.0 standard (standard for data exchange between general usage computers and their peripherals).

The control circuit may advantageously be a system on a chip (SoC), so as to satisfy a high degree of integration required by the miniaturization desired for electronic products of this kind.

Figure 2:
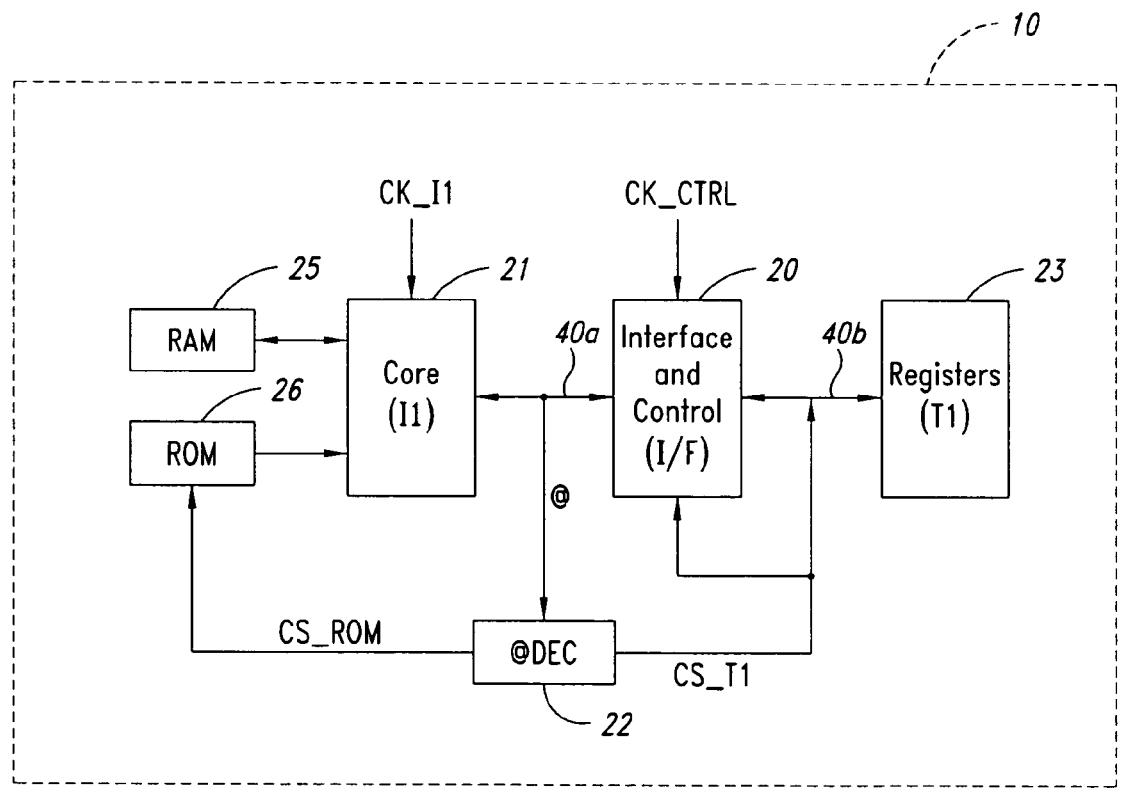
FIG. 2 is a schematic diagram of an exemplary electronic system according to the first embodiment of the invention, which may be included in the memory key of FIG. 1.

FIG. 2 illustrates an exemplary architecture of such a system.

In this example, the system 10 comprises a core 21, which is for example a microcontroller such as the ST7 from STMicroelectronics. This core 21 is designed as a functional module of initiator type (I1). For its communication with other functional modules, it complies with the specifications of a determined communication protocol, for example a proprietary protocol, hereinafter the protocol of the bus of the ST7.

Other initiator modules (not represented), in particular another core such as a coprocessor dedicated to the control operations for controlling the mass storage means formed by the internal memories 2 and 3, may also be provided. Such other modules may for example comply with the specifications of the VCI ("Virtual Component Interface") standard of the VSIA ("Virtual Socket Interface Alliance"), Wakefield, Mass., United States.

A volatile memory (RAM—"Random Access Memory") 25, is used by the module 21 to store temporary information, related to the application concerned.

Moreover, a nonvolatile memory (ROM—"Read Only Memory") 26 stores permanent data, in particular the code of the application which is loaded and executed in the module 21. The memory 26 is sometimes called a program memory. The microcontroller 21 is adapted to extract (or "fetch") the instructions to be executed from the program memory, and to input them to its instruction decoder.

The system 10 also comprises a peripheral controller 23, in particular a USB 2.0 function controller, such as the virtual component MUSBHSFC Inventra™ from Mentor Graphics, in the guise of functional module of target type (T1). This virtual component supports the aforesaid VCI standard.

In an example, the module 23 comprises several data registers (not represented), which may be conventional registers or indexed registers. The target module 23 is addressable by the initiator modules such as the module 21, via a determined address value. For example, to access one of the registers of the module 23, the initiator module 21 generates an access request comprising as parameter the corresponding address of a register of the module 23.

Of course, the system can comprise other target modules (not represented) like the module 23.

In the example represented in FIG. 2, an interface and control module 20 (I/F) is disposed between the modules 21 and 23 to which it is coupled by communication buses 40a and 40b respectively. The bus 40a is for example the communication bus of the ST7 microcontroller, whose communication protocol does not provide for any "handshake". The bus 40b is for example a VCI OCB ("VCI On Chip Bus") bus whose communication protocol, complying with the specifications of the VCI standard, provides for a "handshake".

The module 20 comprises a control unit (FIG. 4) for effecting the interface between the respective protocols of the bus 40a and of the bus 40b.

The module 21 is activated by the edges of a clock signal CK_I1. The module 20 is activated by the edges of a clock signal CK_CTRL. The signals CK_I1 and CK_CTRL are for example delivered by a clock generator (not represented). Here, the activation edges of all the clock signals are considered for example to be the rising edges.

When the initiator module 21 is an ST7 microcontroller, the frequency of the clock signal CK_I1 is for example equal to 15 or 30 MHz, according to the current operating mode of the microcontroller. The frequency of the clock signal CK_CTRL is for example twice as large as the maximum frequency of the signal CK_I1. In the example above, the frequency of the signal CK_CTRL may thus be equal to 60 MHz or more. However, this property is not necessary to the implementation of the invention.

In the example represented, the system furthermore comprises an address decoder 22. This address decoder (@DEC) is coupled to the bus 40a, to decode the address signals deposited by the initiator module 21 on the address bus of the bus 40a as parameters of an access request.

The address decoder 22 delivers a target module selection signal, CS_T1, associated with the target module 23, when the access request relates to a data register of the said module 23. Likewise, it delivers a signal CS_ROM for selecting the program memory 26 when the initiator module accesses same to extract the next instruction to be executed. In an example considered here, the signals CS_T1 and CS_ROM are binary signals active at the logic 1 level, corresponding to a high electrical level.

Figure 3:
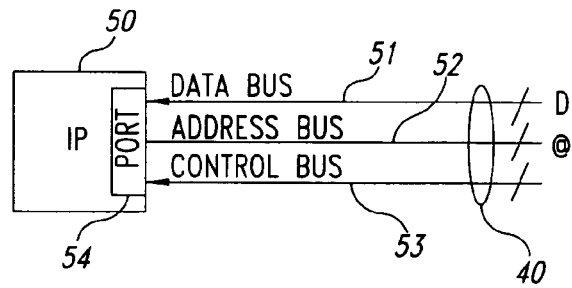
FIG. 3 is a diagram illustrating the coupling of a functional module to a communication bus.

The diagram of FIG. 3 illustrates the connection of any functional module 50 to a communication bus 40 which comprises channels for communicating information between this module and another module of the system.

The communication bus 40 may thus comprise, in an example, a data bus 51, an address bus 52 and a control bus 53. In certain cases, the data bus 51 comprises a data sub-bus for the reading of data, and a data sub-bus for the writing of data. The functional module 50 comprises a communication port 54, which may be of master type or of slave type depending on whether the module 50 is of initiator type or of target type, respectively. The port 54 allows the linking of the module 50 to the communication bus 40.

The data bus 51 is used to transmit the data signals (D), which contain the information exchanged between the modules of the system.

The address bus 52 is used to transmit the address values (@), which identify the register of a target module in which the data transmitted over the data bus have to be read or written, as well as possibly their location inside the module concerned.

Finally, the control bus 53 is used to transmit the control signals. Such signals serve in particular the initiator modules for making requests for access to registers in the target modules. They also serve the target modules for indicating the end of a transaction, and possibly the success or the failure of the transaction. Other control signals also serve to define the direction of the transaction (read/write signal, commonly denoted R/W signal), to synchronize the exchanges, etc.

Figure 4:
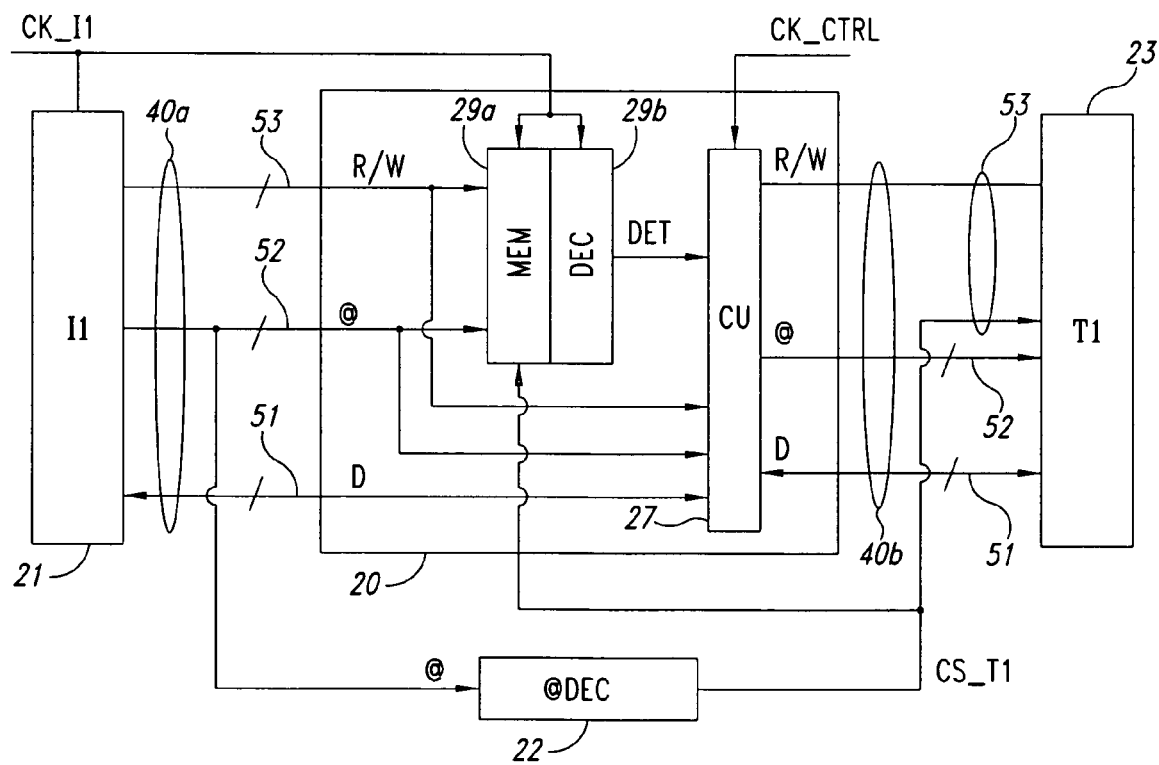
FIG. 4 is a schematic diagram of an exemplary interface and control module useable in a system according to FIG. 2; and, FIG. 5 shows time charts illustrating an exemplary manner of operation of the interface and control module according to FIG. 4.

A first embodiment of the interface and control module 20 will now be described with reference to the diagram of FIG. 4. The connection of the module 20 to the initiator module 21, to the address decoder 22, and to the target module 23 is also represented in this figure.

When the initiator module 21 executes a determined instruction, it initiates one or more requests for access to the target module 23. The parameters of such a request are deposited on the bus 40a, so as to be input to the interface and control module 20. These parameters comprise control information, address information and data information, in the form of logic signals transmitted over the lines of the bus 40a. Corresponding signals are delivered by the module 20 to the target module 23 via the bus 40b, complying with the specifications of the protocol of the bus (both from the purely protocol point of view and from the point of view of the shaping of the signals at the electrical level).

The control information comprises a R/W control signal which is a read/write signal. Such a signal is delivered by the initiator module 21 to the interface and control module 20 via the control bus 53 of the bus 40a. It is for example set to the logic 1 state when the initiator module 21 needs write access to the target module 23, and to the logic 0 state when the initiator module 21 needs read access to the target module 23. It will be noted that a signal of the same kind is produced by the interface and control module 20 and is delivered to the target module 23 via the control bus 53 of the bus 40b, complying with the specifications of the protocol of the bus.

The control information may also comprise other control signals, some of which were introduced above, and on which there is no need to dwell here.

The address information comprises an address @, which identifies the data register of the target module 23 to which the access request relates. This address is coded on a determined number of bits, for example 8, 16 or else 32 bits. It is transmitted via the address buses 52 of the bus 40*a* and of the bus 40*b*, under the control of the interface and control module 20.

More particularly, the interface and control module 20 is coupled to the address bus 52 of the bus 40*a* to receive the address @, and to the address bus 52 of the bus 40*b* to transmit the address @ to the module 23, after a shaping so as to comply with the specifications of the protocol of the bus 40*b*.

In a manner known per se, the address decoder 22 is also coupled to the address bus 52 of the bus 40*a* to receive the address @, and it generates the target module selection signal CS_T1 associated with the target module 23 when this address is that of a register of the module 23. The signal CS_T1 is a control signal indicating to the target module 23 that the access request relates to one of its registers. It is therefore transmitted by the address decoder 22 to the module 23 via the control bus 53 of the bus 40*b*. For this purpose, the address decoder is also coupled to the control bus 53 of the bus 40*b*.

Finally, the data information pertain to the value D to be written (for a write access request) or to the value read (for a read access request) in the target register 23. In the first case, this information is transmitted from the module 21 to the module 23. In the second case, it is transmitted from the module 23 to the module 21. In both cases, it is transmitted via the data bus 51 of the bus 40*a* and of the bus 40*b*, under the control of the interface and control module 20.

More particularly, the interface and control module 20 is coupled to the data bus 51 of the bus 40*a* and to the data bus 51 of the bus 40*b* to transmit the value D, after a shaping so as to comply with the specifications of the protocol of the destination bus. The value D is coded on a determined number of bits, for example 8 or 16 bits.

In order to undertake its function of interface between the respective protocols of the bus 40*a* and of the bus 40*b*, the module 20 comprises a control unit 27 which is coupled to the data bus 51, to the address bus 52 and to the control bus 53 of the bus 40*a* and of the bus 40*b*, so as to receive and/or deliver the above cited information. The unit 27 is activated by the edges of the clock signal CK_CLK.

The interface and control module 20 is constructed so as to set a detection signal DET in response to the execution by the initiator module 21 of a composite instruction, based on information collected on the bus 40*a*, and more particularly on the control bus 53 and on the address bus 52 of the bus 40*a*, during the execution of this instruction.

In one embodiment, the signal DET is a signal internal to the module 20, which is input to the control unit 27, so that the latter performs an appropriate interfacing processing when the instruction undergoing execution by the initiator module 21 is a composite instruction. This processing may include, for example, the implementation of a "handshake" upon each request for access to the target module 23, so as to comply with the specifications of the VCI standard which is supported by the target module 23. The detailed description of this processing would depart from the scope of the present description. Specifically, the invention makes it possible in a general manner to detect, from outside the initiator module 21, that the instruction undergoing execution in this initiator module is a composite instruction, and does not relate to the manner in which this information item is to be used given that this depends on the constraints related to the application.

In one embodiment, one detects that the instruction undergoing execution in the initiator module is a composite instruction by monitoring the evolution over time of the information which is collected on the bus 40*a*. More particularly, information identifying the operation undergoing processing at a determined cycle of the clock signal CK_I1 of the initiator module 21 is compared with information identifying the operation which was processed at the previous cycle of this clock signal. If this information has varied without changing the logic state of the signal CS_T1 for selecting the target module, this is because one is confronted with a different elementary operation, although one is not dealing with a distinct instruction. Hence, the initiator module 21 is currently executing a composite instruction. Specifically, were one dealing with a new elementary operation corresponding to a new instruction, the signal CS_T1 would have been in the inactive state at the previous clock cycle during the extraction ("fetching") of the said new instruction from the program memory 26 (FIG. 2), and would then have reverted to the active state at the current clock cycle.

For this purpose, the interface and control module 20 also comprises a memory 29*a* which is devised so as to store, at each cycle of the clock signal CK_I1, information identifying the operation undergoing processing. This information comprises for example the nature (read or write) of the operation, which is determined by the logic value 0 or 1 of the R/W read/write signal, and furthermore the address @ of the register to which this operation relates. Furthermore, the logic value of the signal CS_T1 for selecting the target module is also stored in the memory 29*a*.

Thus, the memory 29*a* is coupled to the control bus 53 and to the address bus 52 of the bus 40*a*, so as to receive the signal R/W and the address @, as input, respectively. Moreover, the signal CS_T1 is also input to the memory 29*a*. Finally, the memory 29*a* is updated in tempo with the clock signal CK_I1 of the initiator module 21 so as to store the current values of the RIW signal, of the address @ and of the signal CS_T1 at each cycle of the signal CK_I1.

It will be noted that, when the control information constituting parameters of the request comprises control signals other than the R/W signal envisaged here, it can also be stored in the memory 29*a*, so as also to serve for the generation of the signal DET.

A decoding unit 29*b* (DEC) is coupled to the memory 29*a*, and is regulated by the clock signal CK_I1. The unit 29*b* ensures, in a hardware manner (that is to say not through software), the comparison at each cycle of the signal CK_I1 between the current values of the signal R/W, of the address @ and of the signal CS_T1 and their values at the previous cycle of the signal CK_I1 such as were stored in the memory 29*a* (before its update).

The decoding unit 29*b* sets (that is to say places in the logic 1 state) a detection signal DET, in response to the detection of a composite instruction executed by the initiator module 21. This signal DET is supplied to the control unit 27 which uses it for the interfacing, for example to order a "handshake" before generating a request for access to the target module 23.

In one embodiment, the information stored in the memory 29*a* is overwritten at each cycle of the clock signal CK_I1 by the corresponding information which is collected on the bus 40*a*, after comparison with the corresponding information.

A composite instruction executed by the initiator module is in fact detected by monitoring at each determined clock cycle of the initiator module, the evolution of nondedicated information which is collected on the communication bus, with respect to the previous cycle of the initiator module. The expression non-dedicated information is intended to exclude any item of information which would be delivered by the initiator module 21 to indicate directly that the instruction undergoing execution is a composite instruction (such an information item not being delivered by most existing virtual components, the ST7 microcontroller included).

The nondedicated information which is collected at a determined clock cycle of the initiator module comprises on the one hand information identifying the elementary operation undergoing execution by the initiator module 21 at this clock cycle, and on the other hand the current logic value of the signal CS_I1 for selecting the target module.

For example, a composite instruction is detected when, at a determined clock cycle of the initiator module, a change of the elementary operation executed by the initiator module is detected with respect to the previous clock cycle of the initiator module, while, at the same time, the signal for selecting the target module, which was active, is kept active.

Figure 5:
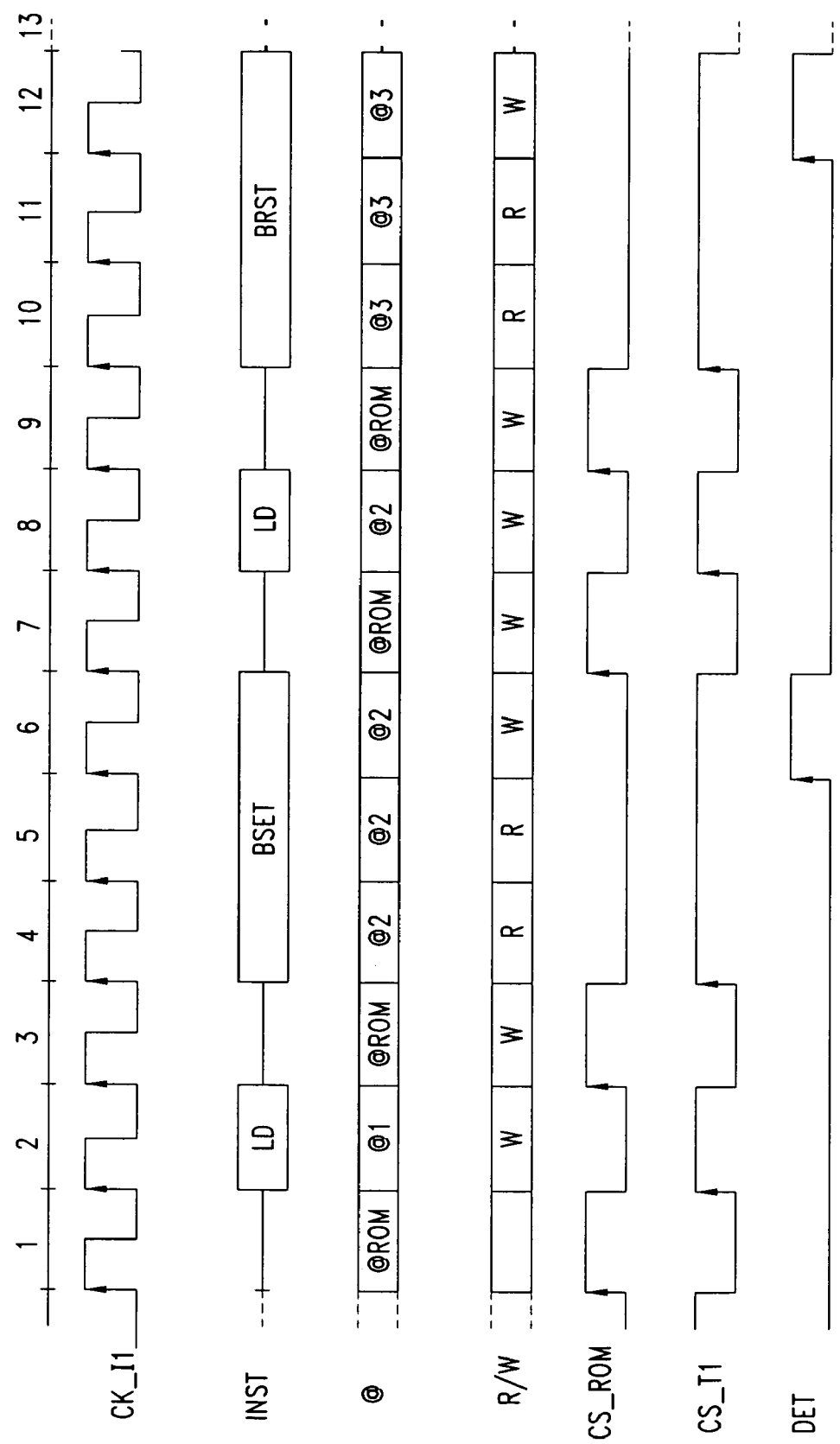

The time charts of FIG. 5 illustrate an example of the manner of operation of the interface and control module 20 according to the present invention. In these flowcharts, the active edges (here the rising edges) of the signals are identified by a (vertical) arrow.

In the example represented, the initiator module is considered to be an ST7 microcontroller, whose code (program) comprises in succession the instructions LD ("Load"), BSET ("Set Bit"), LD, and BRST ("Reset Bit").

The first curve of FIG. 5 shows the clock signal CK_I1 whose rising edges activate the initiator module 21, the memory 29*a* and the decoding unit 29*b*. To facilitate the explanations which follow, the clock cycles of the initiator module have been numbered by indicating numbers 1 to 13 above the periods of the signal CK_I1.

The second curve indicates, as appropriate, the instruction (INST) undergoing execution in the initiator module 21 at each clock cycle. In the example represented, an instruction LD is thus executed at clock cycle No. 2, and another at clock cycle No. 8. Moreover, the instruction BSET is executed at clock cycles No. 4, 5 and 6, and the instruction BRST is executed at clock cycles No. 10, 11 and 12. These instructions BSET and BRST are composite instructions, as was stated in the introduction.

All these instructions relate to registers of the target module 23, having a respective address. In the example, the first instruction LD (that executed at clock cycle No. 2) is an operation for loading a bit into/from the register having the address denoted @1. Likewise, the second instruction LD (that executed in clock cycle No. 8) is an operation for loading a bit into/from the register having the address denoted @2. The operation BSET is an operation for setting a bit in the register having the address @2, and the operation BSET is an operation for reinitializing (resetting) a bit in the register having the address @3.

The third curve of FIG. 5 indicates, for each clock cycle, the address present on the address bus 52 of the bus 40*a*.

The sixth curve shows the signal CS_T1 for selecting the target module 23 as a function of time. This signal is active in the logic 1 state. It is generated by decoding the address present on the address bus 52 of the bus 40*a*. As may be seen, it is therefore active as soon as the address present on this bus is one of the addresses @1, @2 or @3 of the target module 23.

Before the execution of each instruction, the initiator module 21 accesses the program memory 26, so as to extract therefrom the code of the instruction and place it at the input of its instruction decoder. These accesses each take a clock cycle. This is why, during clock cycles No. 1, 3, 7 and 9, there is no instruction undergoing execution. During these clock cycles, the initiator module deposits the address @ROM of the program memory 26 on the address bus 52 of the bus 40*a*, as may be seen in the third curve of FIG. 5.

The fifth curve shows the signal CS_ROM for selecting the program memory 26 as a function of time. This signal is active in the logic 1 state. It is generated by decoding the address present on the address bus 52 of the bus 40*a*. As may be seen, it is therefore active as soon as the address present on this bus is the address @ROM of the program memory 26.

The fourth curve shows the read/write signal R/W as a function of time. This signal is a binary signal, taking for example the logic 0 value for a read operation (R) and the logic 1 value for a write operation (W). In FIG. 5, it has however been preferred to designate the logic value of the signal R/W by the letters R and W, for better readability.

Finally the seventh curve of FIG. 5 shows the composite instruction detection signal DET as a function of time. This signal is active at the logic 1 value.

As may be seen a composite instruction is detected, this being manifested by the switching of the signal DET to the logic 1 value, when, at a determined clock cycle of the initiator module, the value of the signal R/W changes with respect to the previous clock cycle, while, at the same time, the address on the address bus 52 of the bus 40*a* remains constant and the signal for selecting the target module CS_T1 which was active is kept active. This occurs here at clock cycles No. 6 and 12.

Specifically, at clock cycle No. 4, the memory word stored in the register having the address @2 (the R/W signal being on R) is read from the target module; then at clock cycle No. 5 the initiator module produces a new memory word identical to the memory word read except that a determined one of its bits is set (the R/W signal remaining conventionally on R during this clock cycle); and finally, at clock cycle No. 6, the new memory word is written to the register of the target module having the address @2 (the R/W signal then switching over to W). During these clock cycles No. 4, 5 and 6, the signal CS_T1 has remained active since there has been no access to the program memory 26 by the initiator module 21, given that the operations executed are distinct elementary operations of the same BSET instruction. Moreover, the address @2 has remained present on the address bus 52 of the bus 40*a*.

In the same manner, at clock cycle No. 10, the memory word stored in the register having the address @3 (the R/W signal being on R) is read from the target module; then at clock cycle No. 11 the initiator module produces a new memory word identical to the memory word read except that a determined one of its bits is reinitialized (the R/W signal remaining on R during this clock cycle); and finally, at clock cycle No. 12, the new memory word is written to the register of the target module having the address @3 (the R/W signal then switching over to W). During these clock cycles No. 10, 11 and 12, the signal CS_T1 has remained active since there has been no access to the program memory 26 by the initiator module 21, given that the operations executed are distinct elementary operations of the same BRST instruction. Moreover, the address @3 has remained present on the address bus 52 of the bus 40a.

It will be noted that the composite instruction detection signal DET is reinitialized (that is to say reset to the logic 0 state), in response to any change of address, or to a change of value of the signal CS_T1. Here, the signal DET is reinitialized at the start of cycle No. 7 and of cycle No. 13.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An electronic system comprising:
an initiator module complying with specifications of a first communication protocol;
a target module addressable by the initiator module and complying with specifications of a second communication protocol, different from the first communication protocol;
an interface and control module for interfacing between the first communication protocol and the second communication protocol; wherein:
the interface and control module is coupled to the initiator module by a communication bus;
the interface and control module is constructed so as to set a composite instruction detection signal in response to detecting a composite instruction executed by the initiator module, said composite instruction detection signal being used for the interfacing;
the interface and control module is constructed to detect a composite instruction executed by the initiator module by monitoring, at each determined clock cycle of the initiator module, evolution of nondedicated information which is collected on the communication bus, with respect to a previous cycle of the initiator module;
the nondedicated information which is collected at a determined clock cycle of the initiator module includes information identifying an elementary operation undergoing execution by the initiator module at the determined clock cycle, and a current logic value of a signal for selecting the target module; and
a composite instruction is detected when, at a determined clock cycle of the initiator module, a change of the elementary operation executed by the initiator module is detected with respect to the previous clock cycle of the initiator module, while, at the same time, the signal for selecting the target module which was active is kept active.

2. The electronic system according to claim 1, comprising a memory for storing at each cycle of the clock signal of the initiator module the information identifying the elementary operation undergoing execution and the current logic value of the signal for selecting the target module.

3. The electronic system according to claim 2 wherein the information stored in the memory is overwritten at each clock cycle of the initiator module by the corresponding information which is collected on the communication bus, after comparison with the corresponding information.

4. The system according to claim 2, further comprising an address decoder for generating the signal for selecting the target module.

5. The system according to claim 1 wherein the information identifying the elementary operation undergoing execution by the initiator module comprises an instantaneous value of a read/write signal delivered on the communication bus by the initiator module.

6. The electronic system according to claim 5 wherein the information identifying the elementary operation undergoing execution by the initiator module furthermore comprises an instantaneous value of address signals delivered on the communication bus by the initiator module.

7. The electronic system according to claim 6 wherein a composite instruction, comprising an elementary read operation and an elementary write operation at the same address of the target module, is detected when, at a determined clock cycle of the initiator module, the value of the read/write signal changes with respect to the previous clock cycle of the initiator module, while, at the same time, the address signals remain constant and the signal for selecting the target module which was active is kept active.

8. A storage key comprising:
a nonvolatile memory; and
a control circuit that includes:
an initiator module complying with specifications of a first communication protocol;
a target module addressable by the initiator module and complying with specifications of a second communication protocol, different from the first communication protocol;
an interface and control module for interfacing between the first communication protocol and the second communication protocol, wherein:
the interface and control module is coupled to the initiator module by a communication bus;
the interface and control module is constructed so as to set a composite instruction detection signal in response to detecting a composite instruction executed by the initiator module, said composite instruction detection signal being used for interfacing;
the interface and control module is constructed to detect a composite instruction executed by the initiator module by monitoring, at each determined clock cycle of the initiator module, evolution of nondedicated information which is collected on the communication bus, with respect to a previous cycle of the initiator module;
the nondedicated information which is collected at a determined clock cycle of the initiator module includes information identifying an elementary operation undergoing execution by the initiator module at the determined clock cycle, and a current logic value of a signal for selecting the target module; and
a composite instruction is detected when, at a determined clock cycle of the initiator module, a change of the elementary operation executed by the initiator module is detected with respect to the previous clock cycle of the initiator module, while, at the same time, the signal for selecting the target module which was active is kept active.

9. The storage key according to claim 8, comprising a memory for storing at each cycle of the clock signal of the initiator module the information identifying the elementary operation undergoing execution and the current logic value of the signal for selecting the target module.

10. The storage key according to claim 9 wherein the information stored in the memory is overwritten at each clock cycle of the initiator module by the corresponding information which is collected on the communication bus, after comparison with the corresponding information.

11. The storage key according to claim 9, further comprising an address decoder for generating the signal for selecting the target module.

12. The storage key according to claim 8 wherein the information identifying the elementary operation undergoing execution by the initiator module comprises an instantaneous value of a read/write signal delivered on the communication bus by the initiator module.

13. The storage key according to claim 12 wherein the information identifying the elementary operation undergoing execution by the initiator module furthermore comprises an instantaneous value of address signals delivered on the communication bus by the initiator module.

14. The storage key according to claim 13 wherein a composite instruction, comprising an elementary read operation and an elementary write operation at the same address of the target module, is detected when, at a determined clock cycle of the initiator module, the value of the read/write signal changes with respect to the previous clock cycle of the initiator module, while, at the same time, the address signals remain constant and the signal for selecting the target module which was active is kept active.

15. An electronic system comprising:
an initiator module structured to initiate instructions including a composite instruction that includes first and second elementary operations;
a target module addressable by the initiator module; and
control means for controlling access by the initiator module to the target module, the control means including means for detecting that the initiator module has issued the composite instruction and for issuing a composite instruction detection signal in response to detecting that the initiator module has issued the composite instruction, the detecting means detecting that the initiator module has issued the composite instruction by:
determining that a current elementary operation during a current clock cycle is different than a previous elementary operation during an immediately previous clock cycle; and
determining that a signal, indicating whether the target module is being accessed by the initiator module, has not changed logic value in the current clock cycle compared to the immediately previous clock cycle.

16. The electronic system of claim 15, comprising memory means for storing information identifying the previous elementary operation and a current logic value of the signal indicating whether the target module is being accessed by the initiator module.

17. The electronic system of claim 16 wherein the information stored in the memory is overwritten during the current clock cycle by corresponding information identifying the current elementary operation, after comparison with the information identifying the previous elementary operation.

18. The electronic system of claim 16, further comprising an address decoder for generating the signal indicating whether the target module is being accessed by the initiator module.

19. The electronic system of claim 15 wherein the detecting means determine that the current elementary operation is different than the previous elementary operation by monitoring an instantaneous value of a read/write signal delivered by the initiator module.

20. The electronic system of claim 15 wherein the detecting means determine that the current elementary operation is different than the previous elementary operation by monitoring an instantaneous value of address signals delivered by the initiator module.

21. The electronic system of claim 15 wherein the initiator module employs a first communication protocol, the target module employs a second communication protocol, and the control means further include interface means for interfacing between the first communication protocol and the second communication protocol.

22. A method of interfacing an initiator module with a target module, the method comprising:
detecting that the initiator module has issued a composite instruction that includes plural elementary operations; and
issuing a composite instruction detection signal in response to detecting that the initiator module has issued the composite instruction, wherein the detecting step includes:
determining that a current elementary operation during a current clock cycle is different than a previous elementary operation during an immediately previous clock cycle; and
determining that a signal, indicating whether the target module is being accessed by the initiator module, has not changed logic value in the current clock cycle compared to the immediately previous clock cycle.

23. The method of claim 22, further comprising storing information identifying the previous elementary operation and a current logic value of the signal indicating whether the target module is being accessed by the initiator module, wherein the detecting step uses the stored information.

24. The method of claim 23, further comprising overwriting, during the current clock cycle, the information stored in the memory with corresponding information identifying the current elementary operation, after comparing the information identifying the previous elementary operation with corresponding information identifying the current elementary operation.

25. The method of claim 22, wherein the signal indicating whether the target module is being accessed by the initiator module is generated by an address decoder.

26. The method of claim 22 wherein determining that the current elementary operation is different than the previous elementary operation is performed by monitoring an instantaneous value of a read/write signal delivered by the initiator module.

27. The method of claim 22 wherein the initiator module employs a first communication protocol, the target module employs a second communication protocol, and the method further includes interfacing between the first communication protocol and the second communication protocol.

* * * * *